United States Patent
Typaldos et al.

(10) Patent No.: US 6,850,561 B1
(45) Date of Patent: Feb. 1, 2005

(54) PREDICTABLE UPDATING OF A BAUD DIVISOR OF AN ASYNCHRONOUS SERIAL PORT DURING DATA RECEPTION

(75) Inventors: Melanie D. Typaldos, Buda, TX (US); Bruce A. Loyer, Austin, TX (US); Hock-Koon Lee, Singapore (SG)

(73) Assignee: Advanced Micro Devices, Inc., Austin, TX (US)

( * ) Notice: Subject to any disclaimer, the term of this patent is extended or adjusted under 35 U.S.C. 154(b) by 961 days.

(21) Appl. No.: 09/590,353

(22) Filed: Jun. 8, 2000

Related U.S. Application Data

(60) Provisional application No. 60/191,077, filed on Mar. 21, 2000.

(51) Int. Cl.$^7$ .............................. H04B 3/46; H04L 23/00
(52) U.S. Cl. ........................................ 375/225; 375/377
(58) Field of Search ................................ 375/377, 222, 375/316, 295, 219, 354, 257, 258, 224, 225; 370/229, 231, 233, 234; 379/93.01

(56) References Cited

U.S. PATENT DOCUMENTS

| | | | |
|---|---|---|---|
| 3,747,074 A | | 7/1973 | Schulze ................... 340/172.5 |
| 4,003,032 A | | 1/1977 | Austin et al. ............. 340/172.5 |
| 4,949,333 A | * | 8/1990 | Gulick et al. ................ 370/282 |
| 5,131,015 A | * | 7/1992 | Benjaram et al. ........... 375/377 |
| 5,222,081 A | | 6/1993 | Lewis et al. ................. 375/117 |
| 5,490,209 A | | 2/1996 | Kennedy et al. .............. 379/97 |
| 5,557,751 A | * | 9/1996 | Banman et al. ............. 398/136 |
| 5,631,952 A | | 5/1997 | O'Barr et al. ................. 379/93 |
| 5,640,433 A | * | 6/1997 | Szczebak et al. ........... 375/377 |
| 5,654,983 A | * | 8/1997 | Sauser, Jr. ................... 375/225 |
| 5,657,347 A | | 8/1997 | Mori ........................... 375/225 |
| 6,157,689 A | * | 12/2000 | Petty et al. ................. 375/370 |
| 6,366,610 B1 | * | 4/2002 | Loyer et al. ................. 375/225 |

OTHER PUBLICATIONS

Elan™SC400 and ElanSC410 Microcontrollers User's Manual, © 1997 Advanced Micro Devices, Inc., pp. 15–1 through 15–8.

Product Brief MC68360 QUad Integrated Communication Controller (QUICC™), Motorola, 1993, pp. 1–2.

MC68360 QUad Integrated Communications Controller User's Manual, Motorola, pp. 7–1, 7–103–106.

Am186™ED/EDLV, High Performance, 80C186– and 80C188–Compatible, 16–Bit Embedded Microcontrollers, Advanced Micro Devices, Inc., May 1997, pp. 1–2, 47–48.

Am186™ES and Am188™ES User's Manual, © 1997 Advanced Micro Devices, Inc., pp. 10–1 through 10–14.

Am9513A/Am9513 System Timing Controller Technical Manual, Chapter 6, "Frequency Baud Rate Generation," © 1990 Advanced Micro Devices, pp. 6–1 through 6–9.

* cited by examiner

Primary Examiner—Tesfaldet Bocure
(74) Attorney, Agent, or Firm—Akin Gump Strauss Hauer & Feld, LLP

(57) ABSTRACT

A microcontroller employs an asynchronous serial port for predictably updating a baud divisor during data reception. A write enable to the baud counter ensures that the current value of the baud count in the baud counter is greater than a predetermined number of clocks so that the working baud divisor to be loaded from the working baud divisor register is stabilized. The working baud divisor register is updated during data reception by the serial port by a software write to a visible baud divisor register provided the working baud divisor in the working baud divisor register is not being used to load the baud counter. A working baud divisor register thereby maintains a value guaranteed to be stable by the time a baud counter needs to be reloaded. A visible baud divisor register and the baud counter can be on different, possibly asynchronous clocks.

17 Claims, 4 Drawing Sheets

| Baud Rate | 24 MHz | | 25 MHz | | 40 MHz | | 44.2 MHz | | 48 MHz | | 50 MHz | |
|---|---|---|---|---|---|---|---|---|---|---|---|---|
| | Divisor | % Error | Divisor | % Error | Divisor | % Error | Divisor | % Error | Divisor | % Error | Divisor | % Error |
| 300 | 5000 | 0 | 5208 | 0 | 8333 | 0 | 9208 | 0 | 10000 | 0 | 10417 | 0 |
| 600 | 2500 | 0 | 2604 | 0 | 4167 | 0 | 4604 | 0 | 5000 | 0 | 5208 | 0 |
| 1200 | 1250 | 0 | 1302 | 0 | 2083 | 0 | 2302 | 0 | 2500 | 0 | 2604 | 0 |
| 2400 | 625 | 0 | 651 | 0 | 1042 | 0 | 1151 | 0 | 1250 | 0 | 1302 | 0 |
| 9600 | 156 | 0.2 | 163 | -0.1 | 260 | 0.2 | 288 | -0.1 | 313 | -0.2 | 326 | -0.1 |
| 19200 | 78 | 0.2 | 81 | 0.5 | 130 | 0.2 | 144 | -0.1 | 156 | 0.2 | 163 | -0.1 |
| 38400 | 39 | 0.2 | 41 | -0.8 | 65 | 0.2 | 72 | -0.1 | 78 | 0.2 | 81 | 0.5 |
| 57600 | 26 | 0.2 | 27 | 0.5 | 43 | 0.9 | 48 | -0.1 | 52 | 0.2 | 54 | 0.5 |
| 115200 | 13 | 0.2 | 14 | -3.2 | 22 | -1.4 | 24 | -0.1 | 26 | 0.2 | 27 | 0.5 |
| 230400 | 7 | -7.5 | 7 | -3.2 | 11 | -1.4 | 12 | -0.1 | 13 | 0.2 | 14 | -3.2 |
| 460800 | 3 | 7.8 | 3 | 11.5 | 5 | 7.8 | 6 | -0.1 | 7 | -7.5 | 7 | -3.2 |

Serial Port Clock Frequency (PH1 Frequency or CI_UCLK Frequency)

PREDICTABLE UPDATING OF A BAUD DIVISOR OF AN ASYNCHRONOUS SERIAL PORT DURING DATA RECEPTION

This applications claims the benefit of U.S. Provisional Application No. 60/191,077, filed Mar. 21, 2000, which is incorporated herein by reference.

BACKGROUND OF THE INVENTION

1. Field of the Invention

The present invention generally relates to software updating of a baud divisor of an asynchronous serial port, and more particularly to predictable updating of a baud divisor of an asynchronous serial port during data reception.

2. Description of the Related Art

A typical feature of an embedded microcontroller has been a universal asynchronous receiver/transmitter (UART) for providing asynchronous serial communication. Certain microcontrollers with UART support have utilized automatic baud detection (also known as autobauding) in determining a baud rate for data to and from asynchronous serial ports. A baud rate is the rate at which data is sent and received over an asynchronous serial link by a microcontroller. The baud rate must be predetermined or determined through autobauding and independently controlled on both the sending and receiving ends. The standard baud rates in the industry have included 1200, 2400, 4800, 9600, 19.2K, 28.8K, 33.3K, 54K, and 115K data transfer rates. Asynchronous serial communication is commonly used for transferring data to and from memory, or across a bridge from one data bus or device to another. When data is transferred from one bus or device to another, synchronization can be very difficult. Accurately determining a baud rate is therefore important to ensuring successful transmission and reception of data by a microcontroller without data corruption.

The baud rate is a function of a baud divisor. For a UART, a baud clock frequency is typically divided by the baud divisor and multiplied by a certain factor to obtain the baud rate. To state another way, the baud divisor is calculated by dividing a clock frequency by some multiple of the baud rate. A baud divisor register is typically used for storing the baud divisor, and a baud count register or counter is typically used for storing a baud count loaded from the baud divisor register. Both registers are used during data reception. As such, the baud count register may require a reload at any time relative to a write to the baud divisor register.

With automatic baud detection, a baud divisor (which is determined in hardware) may vary slightly from the actual baud divisor value due to a variety of system issues. In some systems where there is a limited number of possible legitimate baud divisor values, software can determine the actual baud divisor value. An update or modification of the baud divisor during data reception however may result in unpredictable behavior, particularly since the behavior of a sending device is often not within the control of designers of the receiving device. Because of this significant possibility of unpredictable behavior, many UARTs have not allowed modification of a baud divisor during data reception.

SUMMARY OF THE INVENTION

An asynchronous serial port is configured for predictably updating a baud divisor during data reception. The serial port includes a working baud divisor register invisible to software and storing a working baud divisor to update a baud counter if the baud counter is enabled. The working baud divisor register is updated by a software write to a baud divisor register during data reception by the serial port unless the working baud divisor is currently updating the baud counter. The serial port also includes baud counter write enable logic to enable the baud counter if the baud count is greater than a predetermined number of clocks sufficient for the working baud divisor to stabilize.

BRIEF DESCRIPTION OF THE DRAWINGS

A better understanding of the present invention can be obtained when the following detailed description of the preferred embodiment is considered in conjunction with the following drawings, in which:

FIG. 3 is an exemplary table of baud rates, clock frequencies and baud divisors for the high speed asynchronous serial port of FIG. 1.

DETAILED DESCRIPTION OF PREFERRED EMBODIMENT

U.S. Pat. application. Ser. No. 09/080,336, entitled "Autobauding with Adjustment to a Programmable Baud Rate" to Bruce A. Loyer and Melanie D. Typaldos, filed May 15, 1998, is hereby incorporated by reference.

Figure 1:
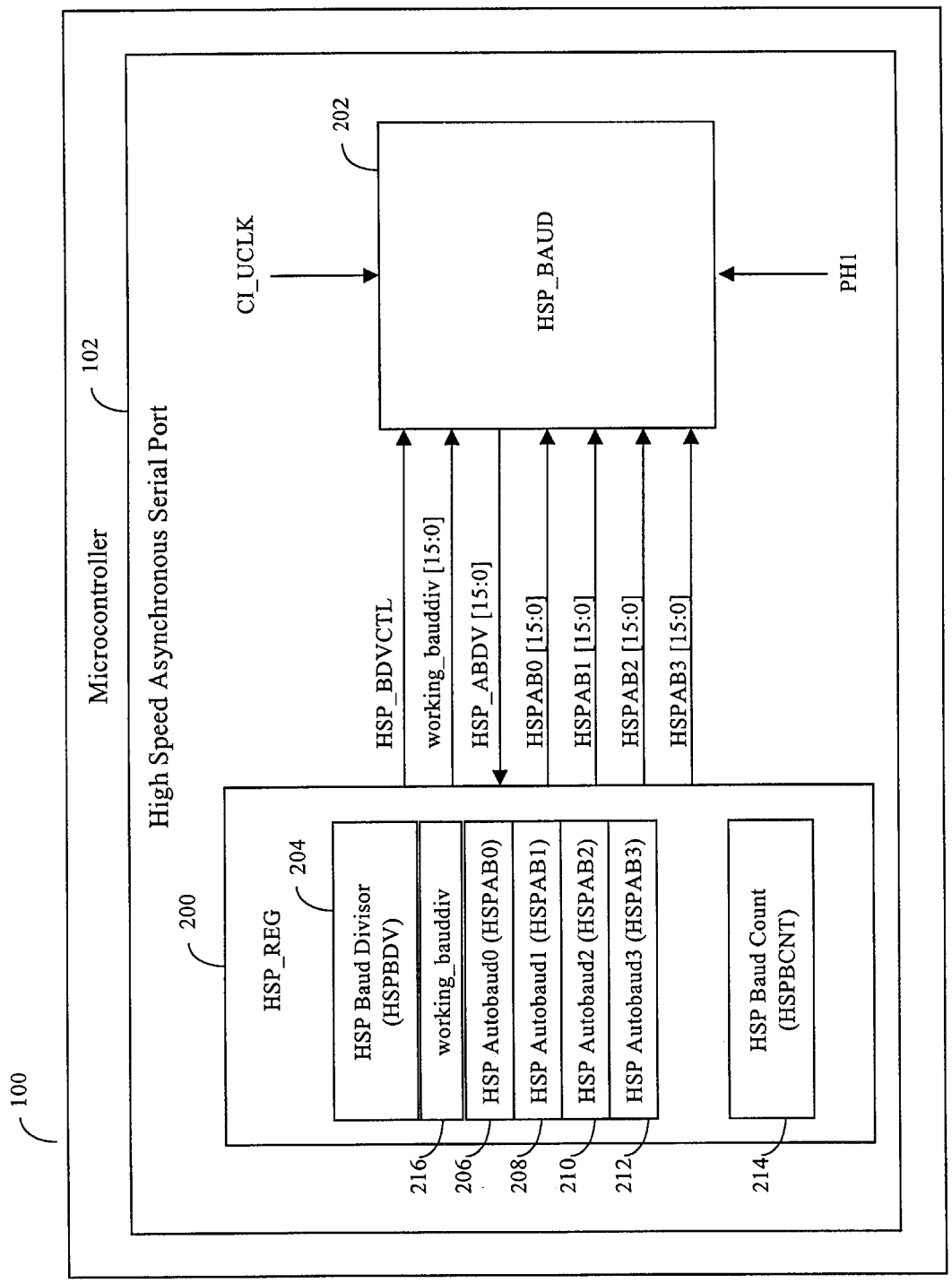
FIG. 1 is a block diagram of an exemplary microcontroller employing a high speed asynchronous serial port with automatic baud detection.

Turning to FIG. 1, shown is a block diagram of a microcontroller 100 employing a high speed asynchronous serial port 102 with automatic baud detection. The microcontroller 100 is preferably implemented on a single monolithic integrated circuit. For sake of clarity, a variety of typical general purpose peripherals of the microcontroller 100 are not shown, such as an execution unit, a watch dog timer, a DMA unit, a timer control unit, a memory control unit, and an interrupt control unit, to name a few. The software described herein can be executed by an execution unit. The microcontroller 100 might also include a variety of serial communication peripherals, such as a High-level Data Link Control (HDLC) controller and a Universal Serial Bus (USB) controller 146. A number of both the communication and general purpose peripherals mentioned could be eliminated or added to the microcontroller 100. Further, the techniques and circuitry disclosed herein could be applied to a wide variety of microcontrollers. The term "microcontroller" itself has differing definitions in industry. Some companies refer to a processor core with additional features (such as I/O) as a "microprocessor" if it has no onboard memory, and digital signal processors (DSPs) are now used for both special and general purpose controller functions. As here used, the term "microcontroller" covers all of these products, and generally means an execution unit with added functionality all implemented on a single monolithic integrated circuit.

The high speed asynchronous serial port 102 includes a HSP_REG block 200 and a HSP_BAUD block 202. The HSP_REG block 200 contains a variety of registers involved in the operation of the asynchronous serial port 102. For sake of clarity, a number of the typical registers supported by the asynchronous serial port 102 are not shown. The HSP_BAUD block 202 is used to generate the autobaud clock. Both a CI_UCLK clock signal and a PH1 clock signal are received by the HSP_BAUD block 202. The PH1 clock corresponds to the system or processor clock of the microcontroller 100, and the CI_UCLK is an external clock source for the asynchronous serial port 102. The asynchronous serial port 102 thus can use either the processor clock PH1 or the external clock CI_UCLK to generate the autobaud clock. The autobaud clock is used by both the receiver and transmitter sections of the asynchronous serial port 102. In a disclosed embodiment, the maximum frequency supported for the external clock CI_UCLK is the processor frequency.

The HSP_REG 200 block is shown including a high speed port baud divisor register (HSPBDV) 204 (visible to software) and a high speed port baud counter (HSPBCNT) 214. The HSP_REG block 200 further includes four high speed autobaud registers (206–212), HSPAB0-HSPAB3. The high speed autobaud registers 206–212 are used in selecting the baud rate for the asynchronous serial port 102. In a disclosed embodiment, each of these high speed autobaud registers 206–212 contains an 8-bit valid baud divisor and an 8-bit divisor threshold value. The HSPBCNT register 214 provides a way to read and write the current value of the baud count by storing a baud count value. The HSPBDV register 204 is a baud divisor register used to specify the baud divisor for generation of the autobaud clock. In an autobaud mode of the asynchronous serial port 102, the receiver section of the serial port 102 writes to the HSPBDV register 204 when the baud rate is determined. In a disclosed embodiment, the baud divisor register 204 determines the baud rate using the following formula: Baud divisor=(UART Frequency/(16* baud rate)). Further details regarding the autobaud mode, the baud divisor register and the autobaud registers can be found in the commonly-assigned U.S. Pat. application Ser. No. 09/080,336, entitled "Autobauding with Adjustment to a Programmable Baud Rate", previously incorporated herein by reference.

A variety of signals are provided between the HSP_REG block 200 and the HSP_BAUD block 202. A HSP_BDVCTL signal provided from the HSP_REG block 200 to the HSP_BAUD block 200 is a control signal used in connection with baud clock generation. A working_bauddiv [15:0] signal from the HSP_REG block 200 is used to provide the baud divisor to the HSP_BAUD block 200. HSPAB0, HSPAB1, HSPAB2 and HSPAB3 signals are provided from the HSP_REG block 200 to the HSP_BAUD block 202. These signals carry the valid baud divisors and divisor thresholds from the HSAPB0-3 registers 208–212. A HSP_ABDV[15:0] signal is provided from the HSP_BAUD block 202 to the HSP_REG block 200. This signal represents the new value for the baud divisor register 204 as determined in the autobaud mode.

In a disclosed embodiment, the baud counter 214 and the baud divisor register 204 are in different clock domains and as such can be asynchronous. The baud count register 214 is in the external clock domain, and the baud divisor register 204 is in the processor clock domain. With previous autobaud techniques, because the baud counter 214 and the baud divisor register 204 were tied to different clocks, it was difficult to determine when it was okay to update either register. This has particularly been the case when one register is updated on its own. Performing an update of one register in one clock domain under this set of circumstances has resulted in the value of the register in the other clock domain being unpredictable.

A working baud divisor register (working_bauddiv) 216 in the HSP_REG block 200 is used to hold a value guaranteed to be stable by the time the baud counter 214 needs to be reloaded. The baud counter 214 is only reloaded on a next baud clock when it completes a countdown (i.e., when the baud count reaches one). Write enable logic for the baud count register 214 checks that the current value of the baud count is greater than a predetermined number of clocks. In a disclosed embodiment, the predetermined number of clocks in the other clock domain is three and is sufficient for the count value of the baud counter 214 to stabilize. Based on the operating conditions for the asynchronous serial port 102 whereby the external clock cannot be faster than the processor clock, this number of clocks is guaranteed to not be faster than the processor clock. For example, if the processor clock (PH1) is set to 50 mHz, then the external clock might be set to 33 mHz. The external clock can be used to allow an exact division and accurate generation of data for a standard baud rate when the processor clock PH1 cannot be divided to produce the standard baud rate within acceptable tolerance. The working baud divisor register 216 ultimately feeds the baud counter 214 using the working_bauddiv signal to the HSP_BAUD block 202. The working baud divisor register cannot be updated by software while its current value is being used to update the baud counter 204. In this way, loading of an unpredictable value into the working baud divisor register is avoided. The working baud divisor register 216 is a phantom or invisible register in the sense that the register 216 is not visible to software and it fulfills a function normally attributable to a software programmable register. The working baud divisor register 216 provides a shadow copy of the visible baud divisor register 204 and differs from the baud divisor register 204. The working baud divisor register 216 cannot be updated when the baud counter 214 needs to be reloaded. The working register 216 may therefore not always contain the last value written by software into the visible baud divisor register 204.

Figure 2:
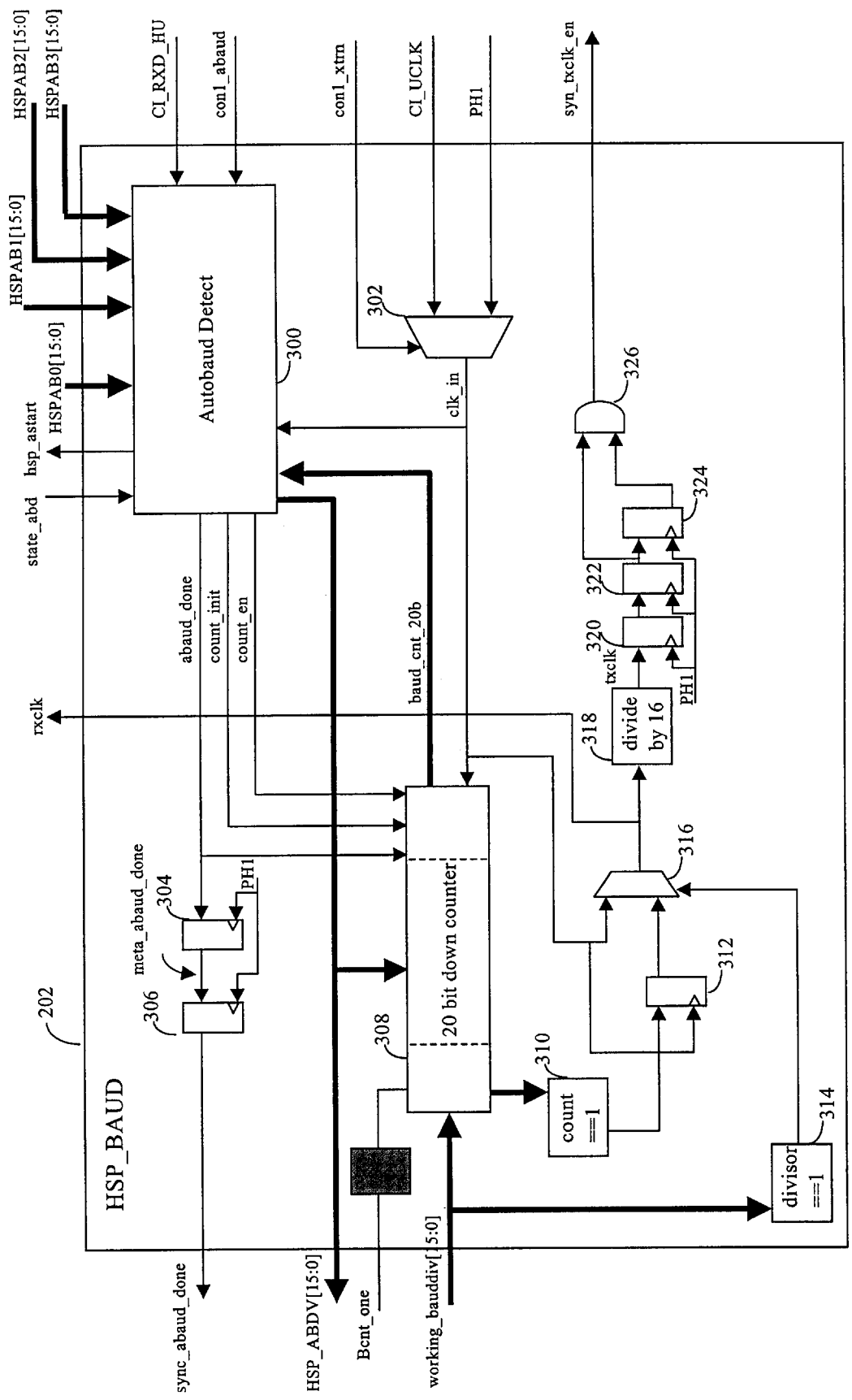
FIG. 2 is a schematic diagram of the HSP_BAUD block of FIG. 1.

Turning to FIG. 2, a schematic diagram of the HSP_BAUD block 202 is shown. The autobaud signals HSPAB0, HSPAB1, HSPAB2 and HSAPB3 are provided to an autobaud detect block 300. Autobaud detection occurs in the following manner. Autobaud detection is not begun until the receiver section of the asynchronous serial port 102 enters a str_abd (start autobaud) state. The autobaud detect block 300 receives a state_abd signal which indicates whether the receive section has entered the str_abd state. At this point, a baud count register (baudctr) in the autobaud detect block 300 is loaded with a predetermined value, such as the maximum value of the register minus one-half of the oversampling rate. This value is represented in FIG. 2 by the baud_cnt_20b signal. The baud count register 204 decrements on each input clock until an hsp astart signal is deasserted. During normal operation when the asynchronous serial port 102 is not in the autobaud detection mode, the baud counter 214 decrements on each se1_clk. The hsp_astart signal is shown as an output signal of the autobaud detect block 300. Next, the upper sixteen bits of the current count are inverted and compared to threshold values in the autobaud registers 206–212. Depending upon the relative values of the current count and the threshold values, a new baud divisor from either the inverted current count or one of the valid divisors of the autobaud registers is selected. The new baud divisor is then written to the baud divisor register HSPDV and simultaneously to the lower sixteen bits of the baud counter 214 using the abaud_done signal.

The autobaud detect block 300 receives a CI_RXD_HU signal and a con1_abaud signal. The CI_RXD_HU signal is passed to the autobaud detect block 300 from the receiver section of the asynchronous serial port 102. The con1_ abaud signal is used as an address bit enable signal. The autobaud detect block 300 outputs an abaud_done signal, a count_init signal and a count_en signal. The abaud_done signal is an autobaud detect complete signal. The count_init signal is used to initialize the baud count. The count_en signal is used to enable the autobaud count. Each of these three signals are provided to a 20-bit down counter 308. The HSP_ABDV [15:0] signal is also provided from the autobaud detect block 300 to the down counter 308. As mentioned above, this signal represents a new value for the baud divisor register 204. The abaud_done signal is provided to a flip-flop 304, which is clocked by the system clock PH1. The output of the flip-flop 304 is provided to the flip-flop 306 which is also clocked by the system clock PH1. The output of the flip-flop 304 is designated a meta_abaud_done signal, and the output of the flip-flop 306 is designated as the sync abaud_done signal.

As shown, the down counter 308 receives a HSP_ABDV [15:0] signal and a bcnt_one signal and outputs a baud_cnt_20b signal back to the autobaud detect block 300. The down counter 308 also provides a signal to a count block 310. The output of the count block 310 is provided to a flip-flop 312. The output of the flip-flop 312 serves as an input for a multiplexor 316. The select signal for the multiplexor 316 is provided from a divisor block 314. Like the counter 308, the divisor block 314 receives the working_bauddiv signal as an input. The other input signal of the multiplexor 316 is a clk_in signal from a multiplexor 302. This clk_in signal is also used to clock the flip-flop 312. The multiplexor 316 outputs a rxclk signal to a divide-by-16 block 318. The output of the divide-by-16 block 318 is provided to a flip-flop 320. This input to the flip-flop 320 is designated as the txclk signal. The output of the flip-flop 320 is provided to a flip-flop 322. The output of the flip-flop 322 is provided as an input to a flip-flop 324. The system clock PH1 is used to clock the flip-flops 320–324. The output of the flip-flop 322 and the output of the flip-flop 324 serve as input signals to an AND gate 326. The output of the AND gate 326 is designated as a syn_txclk_en signal. The gate 302 receives the CI_UCLK signal and the PH1 signal as input signals. The select signal for the multiplexor 302 is a con1_xtrn signal. The con1_xtrn signal is a software programmable register bit that governs whether se1_clk is an externally provided clock or another version of PH1.

Referring to FIG. 3, an exemplary table of clock frequencies, baud rates, and baud divisors for the asynchronous serial port 102 is shown. This table is illustrative of the error that occurs between a nominal or determined baud rate and the actual baud rate. In particular, the "% Error" column is the amount the actual baud rate varies from the nominal rate. This type of error can be corrected in a predictable fashion with the techniques described herein.

Figure 4:
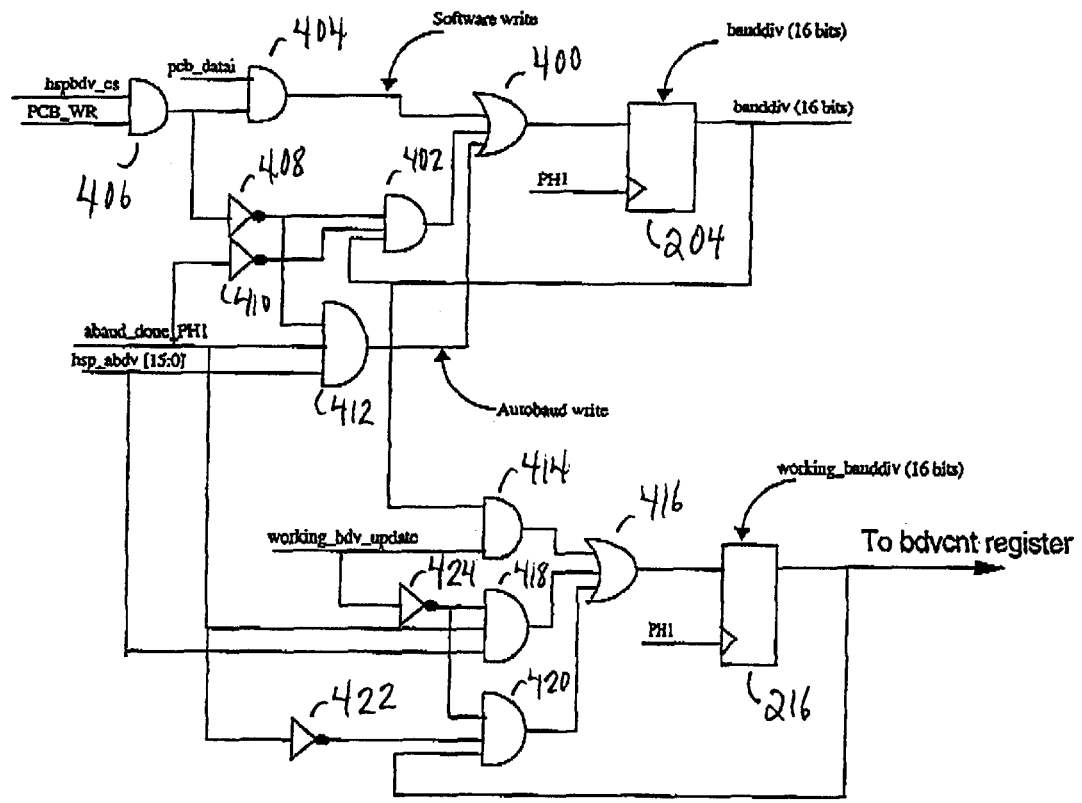
FIG. 4 is a schematic diagram illustrating the relationship between the bauddiv register and the working_bauddiv register of FIG. 1.

Referring to FIG. 4, the relationship between the visible bauddiv register 204 and the invisible working_bauddiv register 216 is shown. The bauddiv register 204 receives an output signal from an OR gate 400 as an input signal. The output signals of an AND gate 404, an AND gate 402 and an AND gate 412 are inputs to the OR gate 400. An output of an AND gate 406 serves as an input to the AND gate 404. The two input signals to the AND gate 406 include the hspbdv_cs signal and the PCB_WR signal. The other input of the AND gate 404 is the PCB_datai signal. The output signal of the AND gate 404 represents a software write. Output signals of an inverter 408 and an inverter 410 serve as input signals to the AND gate 402. The bauddiv signal generated by the bauddiv register 204 serves as an input to the AND gate 402 and also as an input to an AND gate 414.

The output of the AND gate 406 serves as the input of the inverter 408. The abaud_done_PH1 signal serves as an input signal to the inverter 410. The input signals to the AND gate 412 include the output signal of the inverter 408, the abaud_done_PH1 signal and the hsp_abdv signal. The output of the AND gate 412 serves as an input to the OR gate 400. This output signal represents an autobaud write.

The input signals to the AND gate 414 include the bauddiv signal and the working_bdv update signal. An output signal of the AND gate 414 serves as an input signal to an OR gate 416. The working_bdv_update signal is also an input to an inverter 424. The output signal of the inverter 424 is provided as an input signal to both an AND gate 418 and an AND gate 420. The abaud_done_PH1 signal also serves as an input signal to the AND gates 418 and 420. In the case of the AND gate 420, however, the abaud_done_PH1 signal is first inverted by an inverter 422. The inverted signal generated by the inverter 422 is provided as an input to the AND gate 420. The output signals of the AND gates 414, 418 and 420 serve as input signals to an OR gate 416. The output of the OR gate 416 serves as an input signal to the working_bauddiv register 216. The output signal of the working_bauddiv register 216 is provided to the bdvcnt register and the AND gate 420. Both the bauddiv register 204 and the working_bauddiv register 216 are clocked by the PH1 clock.

Thus, both the bauddiv register 204 and the working_bauddiv register 216 are updated by an autobaud done condition. The bauddiv register 204 is updated by software, while the working_bauddiv register 216 is updated by a write to the bauddiv register 204, provided the working_bdv_update signal is asserted. The working_bdv_update signal ensures that the working_bauddiv register 216 is not updated while its value is being used to load the baud counter. In addition, the working_bdv_update signal can be deasserted for many PH1 clocks. Also, the bauddiv register 204 can read back the last value written, even if that value cannot yet be loaded into the working_bauddiv register 216. Software may write and read the bauddiv register 204 multiple times before any new value is written to the working_bauddiv register 216.

Thus, in accordance with the disclosed techniques for asynchronous serial ports, during data reception, a baud divisor register and a baud count register are predictably updated. When a baud divisor is greater than one, a phantom or invisible register is used to hold a value guaranteed to be stable by the time the baud count register needs to be reloaded. When the baud count register is not being reloaded, writes to the baud divisor register are clocked into the phantom register. When the baud count register needs to be reloaded, writes to the phantom register are inhibited. The baud divisor register and the baud count register may even be on different clocks. When software desires to change a baud divisor from one to some other number during data reception, it cannot be expected that the data will be received uncorrupted. This is because the smallest modification (e.g., from 1 to 2) results in a 100% difference in the baud divisor and consequently in the timing of sequential bits. The disclosed techniques can be applied to a wide variety of UARTs which support automatic baud rate detection.

The disclosure and description of the various embodiments are illustrative and explanatory thereof, and various changes in the registers, signals, counters, and other logic and circuitry, as well as in the details of the illustrated hardware and software in construction and method of operation may be made without departing from the spirit of the invention.

We claim:

1. A method of predictably updating a baud divisor of an asynchronous serial port during data reception, the asynchronous serial port including a baud divisor register storing a baud divisor and a baud counter storing a baud count, the method comprising the steps of:

storing a working baud divisor invisible to software to update the baud counter; and updating the working baud divisor during data reception by the asynchronous serial port based on a software write to the baud divisor register unless the baud counter is currently being updated with the working baud divisor.

2. The method of claim 1, further comprising the step of:

enabling the baud counter if the baud count is greater than a predetermined number of clocks sufficient for the working baud divisor to stabilize.

3. The method of claim 2, further comprising the step of:

updating the baud counter with the working baud divisor if the baud counter is enabled.

4. The method of claim 1, further comprising the step of:

writing to the baud divisor register with software during data reception by the asynchronous serial port.

5. The method of claim 4, the writing step comprising the step of:

writing to the baud divisor register before the step of updating the working baud divisor.

6. The method of claim 1, further comprising the step of:

reading the baud divisor register before the step of updating the working baud divisor.

7. The method of claim 1, further comprising the steps of:

clocking the baud divisor register with a first clock; and clocking the baud counter with a second clock such that the baud divisor register and the baud counter are in different clock domains.

8. An asynchronous serial port configured for predictably updating a baud divisor during data reception, the asynchronous serial port including a baud divisor register storing a baud divisor and a baud counter storing a baud count, the asynchronous serial port comprising:

a working baud divisor register invisible to software and storing a working baud divisor to update the baud counter if the baud counter is enabled, the working baud divisor register being updated during data reception by the asynchronous serial port by a software write to the baud divisor register unless the working baud divisor register is currently updating the baud counter; and baud counter write enable logic to enable the baud counter if the baud count is greater than a predetermined number of clocks sufficient for the working baud divisor to stabilize.

9. The asynchronous serial port of claim 8, wherein the baud divisor register is written by software before the working baud divisor is updated.

10. The asynchronous serial port of claim 8, wherein the baud divisor register is read by software before the working baud divisor is updated.

11. The asynchronous serial port of claim 8, wherein the baud divisor register is clocked by a first clock and the baud counter is clocked by a second clock such that the baud divisor register and the baud counter are in different clock domains.

12. The asynchronous serial port of claim 11, wherein the first clock and the second clock are asynchronous.

13. An asynchronous serial port configured for predictably updating a baud divisor during data reception, the asynchronous serial port including a baud divisor means for storing a baud divisor and a baud count means for storing a baud count, the asynchronous serial port comprising:

a working baud divisor means invisible to software for storing a working baud divisor to update the baud count means if the baud count means is enabled, the working baud divisor means being updated by a software write to the baud divisor means during data reception by the asynchronous serial port unless the working baud divisor means is currently updating the baud count means; and a baud count write enable means to enable the baud count means if the baud count is greater than a predetermined number of clocks sufficient for the working baud divisor to stabilize.

14. The asynchronous serial port of claim 13, wherein the baud divisor means is clocked by a first clock and the baud count means is clocked by a second clock such that the baud divisor means and the baud count means are in different clock domains.

15. The asynchronous serial port of claim 14, wherein the first clock and the second clock are asynchronous.

16. The asynchronous serial port of claim 13, wherein the baud divisor means is written by software before the working baud divisor is updated.

17. The asynchronous serial port of claim 13, wherein the baud divisor means is read by software before the working baud divisor is updated.

* * * * *